Aug. 7, 1923.
J. SCHOONHOVEN
ANIMAL TRAP
Filed March 1, 1922
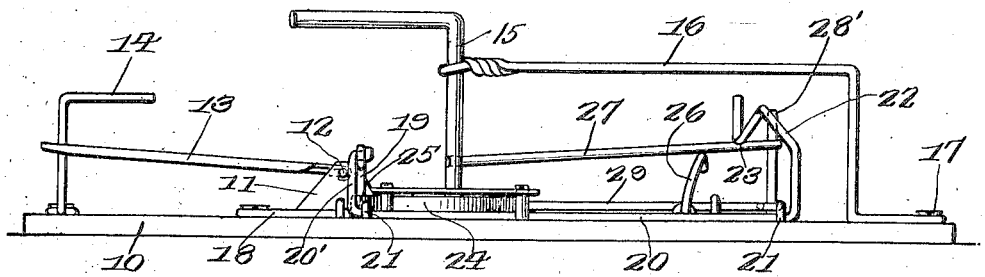
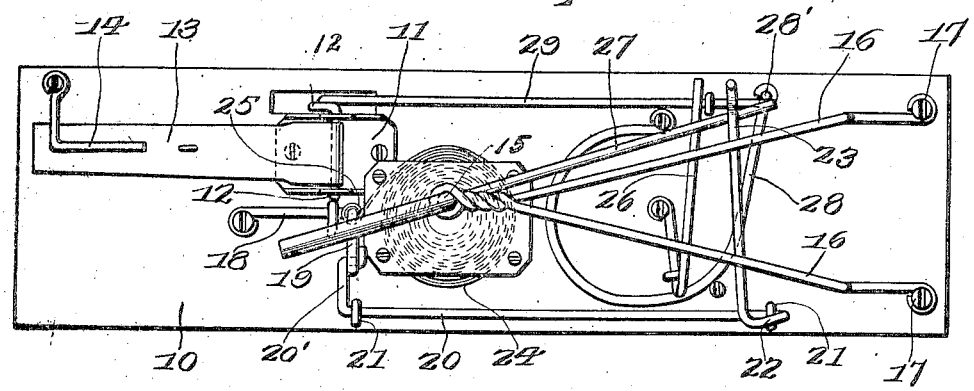
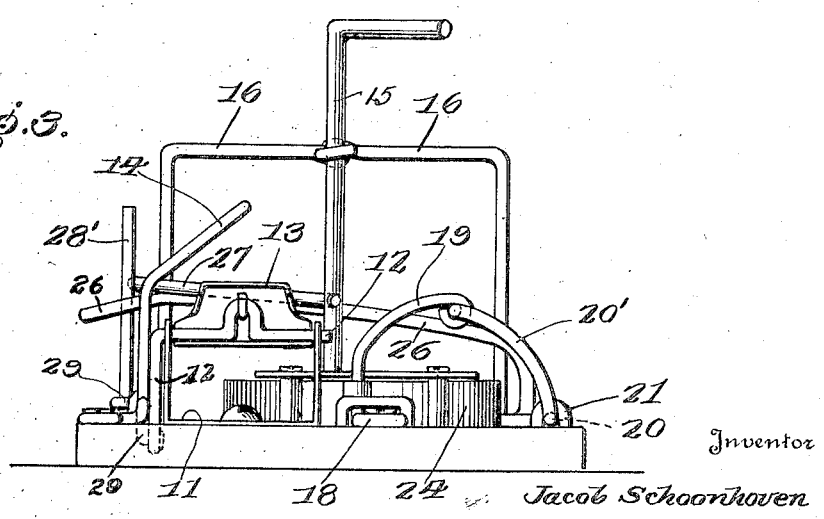
Inventor
Jacob Schoonhoven
By Horace Chandler
Attorney Patented Aug. 7, 1923.

1,463,846

UNITED STATES PATENT OFFICE.

JACOB SCHOONHOVEN, OF SHANNON, ILLINOIS.

ANIMAL TRAP.

Application filed March 1, 1922. Serial No. 540,231.

*To all whom it may concern:*

Be it known that I, JACOB SCHOONHOVEN, a citizen of the United States, residing at Shannon, in the county of Carroll, State of Illinois, have invented certain new and useful Improvements in Animal Traps; and I do hereby declare the following to be a full, clear, and exact description of the invention, such as will enable others skilled in the art to which it appertains to make and use the same.

This invention relates to new and useful improvements in traps and particularly to animal traps.

One object of the invention is to provide an animal trap of the type which has a striking arm for striking the animal as it attempts to eat the bait, with novel and improved means for setting the trap and guard means for the striking arm.

Another object is to provide a novel and improved construction of detent and tripping means for the striking arm, whereby to insure against accidental release, and to insure positive and deadly operation of the striking arm.

Other objects and advantages will be apparent from the following description when taken in connection with the accompanying drawing.

In the drawing:

Figure 1 is a side elevation of a trap made in accordance with the invention.

Figure 2 is a top plan view of the same.

Figure 3 is an end view of the trap.

Referring particularly to the accompanying drawing, 10 represents a base, which may be formed from wood, metal, or other suitable material, and mounted on the upper face of the base, adjacent one end, is a metal plate 11, having its ends turned upwardly into parallel relation, and formed with openings to receive the pivot pin 12. On this pivot pin 12 is secured the inner end of the trip pan 13, which extends horizontally toward the adjacent end of the board. Adjacent the said end of the base board is a bait holding member, which rises above the base, as at 14. Mounted in the approximate center of the base is a vertical shaft 15, and supporting the upper end of the shaft are the convergent ends of the horizontal arms 16, which extend to and are secured to the other end of the base, as shown at 17. Secured at one of its ends to the base, adjacent the plate 11, is a lever 18, the other end of said lever extending upwardly, as at 19, and being loosely connected with the outer end of an arm formed on a shaft 20, which is rotatably supported in the brackets 21, and which shaft extends to a point adjacent the other end of the base. This arm, of the shaft 20, is indicated by the numeral 20'. The other end of the shaft 20 is formed with an upwardly extending portion 22, which then extends transversely of the base and is downwardly bowed, as shown at 23. A motor spring 24 is coiled around the vertical shaft 15, and has its inner end secured to the shaft and its outer end formed with an eye 25 which receives therethrough the arm 19. As the bowed arm 23 is lifted, the shaft 20 will be rocked against the tension of the outer end of the motor spring, through the engagement of the arms 19 and 20'. The motor spring thus serves to maintain the arm 23 in a depressed position, for a purpose which will presently appear. An upwardly bowed, and transversely extending arm 26 is secured to the base, and extends in close proximity to the arm 23. Rigidly carried by the shaft 15, and extending radially therefrom, is the animal striking arm 27, the same being arranged to sweep around in a circular path across the trip pan, and between the arms 23 and 26. It will be noted, upon reference to Figure 3, that the arms 23 and 26 are resilient and bear inwardly to frictionally engage with the striking arm 27 to check its movement after having struck an animal at the trip pan. A coiled spring arm 28 is secured to the base, and has one end extended transversely of the base and upwardly at a point outwardly of the free end of the arm 23. This upwardly extending portion 28', of the arm 28, serves as a stop for the striking arm, when said arm passes between the arms 23 and 26, and holds the same against a second rotary movement, until released by another depression of the trip pan.

The other end of the pivot pin 12, of the trip pan, is extended downwardly through a small opening or slot, in the base, and is pivotally connected with a link 29, which extends longitudinally of the base, and is engaged with the upwardly extending portion 28'.

When an animal steps onto the trip pan, and attempts to eat the bait, the pan will be depressed, under the animal's weight, with the result that the link 29 will be pushed by the arm of the pivot pin 12, and the member 28' pushed beyond the outer end of the striking arm, with the result that the motor spring will rotate the shaft 15, carrying with it the striking arm, striking the animal, at the bait, after which the striking arm passes between the arms 23 and 26, and is brought to a stop by the arm 28', which has returned to its normal position.

The upper end of the shaft 15 is provided with a handle which is grasped to rotate the shaft for the purpose of winding the motor spring.

The trap is thus a self-set and ever-set, and does not require attention, except to replenish the bait.

What is claimed is:

1. An animal trap comprising a base, a motor driven striking arm mounted on the base, a trip pan, a bait holder adjacent the trip pan, a friction means between which the striking arm passes upon completion of a stroke, a resiliently mounted stop for the striking arm, and a link connecting the trip pan with the stop for releasing the stop.

2. An animal trap comprising a base, a motor driven rotary striking arm, a resilient stop for the arm upon completion of a stroke, a pair of oppositely bowed arms for frictionally engaging the striking arm to check its movement at the completion of a stroke and prior to engagement thereof with the said stop, one of the bowed arms being connected with and resiliently held by one end of the motor spring, a trip pan pivotally mounted on the base, and connections between the pivot of the trip pan and the stop.

In testimony whereof, I affix my signature, in the presence of two witnesses.

JACOB SCHOONHOVEN.

Witnesses:
M. F. SHAFER,
S. H. VIETMEYER.